(12) United States Patent
Getman et al.

(10) Patent No.: US 8,576,296 B2
(45) Date of Patent: Nov. 5, 2013

(54) IMAGE INTERPOLATION METHOD USING BAYER PATTERN CONVERSION, APPARATUS FOR THE SAME, AND RECORDING MEDIUM RECORDING THE METHOD

(75) Inventors: Alexander Getman, Suwon-si (KR); Jin Hak Kim, Seoul (KR); Tae Chan Kim, Yongin-si (KR); Hee Min Park, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 251 days.

(21) Appl. No.: 13/006,982

(22) Filed: Jan. 14, 2011

(65) Prior Publication Data

US 2011/0176036 A1 Jul. 21, 2011

(30) Foreign Application Priority Data

Jan. 15, 2010 (KR) ........................ 10-2010-0003862

(51) Int. Cl.
*H04N 5/228* (2006.01)

(52) U.S. Cl.
USPC ........ 348/222.1; 348/272; 348/273; 348/294; 382/254

(58) Field of Classification Search
USPC ................ 348/273, 222.1, 272, 294; 382/254
See application file for complete search history.

(56) References Cited

U.S. PATENT DOCUMENTS

| 7,911,507 B2 * | 3/2011 | Egawa et al. ............... 348/230.1 |
| 2003/0117507 A1 * | 6/2003 | Kehtarnavaz et al. ........ 348/242 |
| 2008/0211943 A1 * | 9/2008 | Egawa et al. ................. 348/294 |

* cited by examiner

*Primary Examiner* — Antoinette Spinks
(74) *Attorney, Agent, or Firm* — Harness, Dickey & Pierce, P.L.C.

(57) ABSTRACT

A method of interpolating a signal output from an image sensor including a pixel array having an M×N matrix as a basic pixel block where M and N are integers is provided. The method includes selecting a target pixel signal from among pixel signals output from the basic pixel block; and converting a pattern of a pixel signal output from the pixel array into a Bayer pattern by converting a pixel signal output from the basic pixel block into the Bayer pattern through an operation on the target pixel signal and a neighboring pixel signal of the target pixel signal and interpolating an output signal converted into the Bayer pattern.

14 Claims, 7 Drawing Sheets

FIG. 3C

| A (−2,−2) | B (−2,−1) | A (−2,0) | B (−2,1) | A (−2,2) |
|---|---|---|---|---|
| C (−1,−2) | D (−1,−1) | C (−1,0) | D (−1,1) | C (−1,2) |
| A (0,−2) | B (0,−1) | A,Da (0,0) | B (0,1) | A,Da (0,2) |
| C (1,−2) | D (1,−1) | C (1,0) | D (1,1) | C (1,2) |
| A (2,−2) | B (2,−1) | A (2,0) | B (2,1) | A (2,2) |

30

31

IMAGE INTERPOLATION METHOD USING BAYER PATTERN CONVERSION, APPARATUS FOR THE SAME, AND RECORDING MEDIUM RECORDING THE METHOD

CROSS-REFERENCE TO RELATED APPLICATIONS

This application claims priority under 35 U.S.C. §119 to Korean Patent Application No. 10-2010-0003862, filed on Jan. 15, 2010, in the Korean Intellectual Property Office (KIPO), the entire contents of which are incorporated herein by reference.

BACKGROUND

Example embodiments of present invention relate to an image interpolation method using Bayer pattern conversion, and more particularly, to a method of converting an output signal of a pixel array into a Bayer pattern and interpolating the Bayer pattern signal and a recording medium recording the method.

To represent a color image correctly, three color samples, i.e., red (R), green (G) and blue (B) samples may be needed for each pixel. However, if multiple color filters are mounted in each pixel to extract the three colors, the structure of a device will be complicated and it is not economical. For these reasons, digital image input devices, such as digital cameras and mobile phone equipped with cameras, use a color filter array (CFA), such as a Bayer filter, which extracts only a single color at each pixel to reduce the number of color samples and interpolate a Bayer color pattern output from an image sensor in an image signal processor (ISP) to generate a full-color RGB image.

One of the important purposes of the image interpolation is to obtain an image of high quality by effectively removing or reducing noise from the image. However, conventional image processing methods do not provide satisfactory resolution or photosensitivity and therefore do not provide clear images.

SUMMARY

Example embodiments of the present invention provide a method of converting a signal output from a pixel array into a Bayer pattern and then interpolating the signal, thereby generating a high-quality image even through input data includes noise, and a recording medium recording the method.

According to example embodiments of the present invention, there is provided a method of interpolating a signal output from an image sensor including a pixel array having an M×N matrix as a basic pixel block where M and N are integers. The method includes the operations of selecting a target pixel signal from among pixel signals output from the basic pixel block; and converting a pattern of a pixel signal output from the pixel array into a Bayer pattern by converting a pixel signal output from the basic pixel block into the Bayer pattern through an operation using the target pixel signal and a neighboring pixel signals of the target pixel signal and interpolating an output signal converted into the Bayer pattern.

According to example embodiments of the present invention, converting the pattern of the pixel signal output from the pixel array may include using an expression $$Da_{0,0} = \sum_{\substack{i=\{-M,\ldots,-2,-1,0,1,2,\ldots,M\} \\ j=\{-N,\ldots,-2,-1,0,1,2,\ldots,N\}}} \alpha_{i,j} X_{i,j} + \beta_0 \cdot Dcorr,$$

where $Da_{0,0}$ represents a signal value of the converted pixel signal, $X_{i,j}$ represents output signal values the neighboring pixels of the converted pixel, $\alpha_{i,j}$ and $\beta_0$ are variable parameters, and $$Dcorr = \sum_{\substack{i=\{-M,\ldots,-2,-1,0,1,2,\ldots,M\} \\ j=\{-N,\ldots,-2,-1,0,1,2,\ldots,N\}}} w_n D_{i,j}$$

where $w_n$ is a weight determined based on variation of the target pixel signal and $D_{i,j}$ represents output signal values of one type of the neighboring pixels.

According to example embodiments of the present invention, the weight $w_n$ may be defined by $$\frac{v_n}{\sum v_n},$$

where $v_n = \exp(-Var_n/Th)$, $Var_n$ is the variation, Th is a threshold value, and $\Sigma w_n = 1$.

According to example embodiments of the present invention, the weight $w_n$ may be obtained based on an expression $k = order(Var_n), w_n = kc_k, c_k = const; \Sigma w_n = 1$, where k is a value corresponding to a descending rank order of the variation $Var_n$ and $c_k$ is a constant.

According to example embodiments of the present invention, the parameter $\alpha_{i,j}$ may satisfy an expression $\alpha_{i,j} = \alpha_{-i,-j} = \alpha_{i,-j} = \alpha_{-i,j}$.

According to example embodiments of the present invention, the weight $w_n$ may be defined as a function of the variation of the target pixel signal, the function of the variation being a decreasing function.

According to example embodiments of the present invention, the method may further comprise repeatedly adjusting the two variable parameters $\alpha_{i,j}$ and $\beta_0$.

According to example embodiments of the present invention, the operation of interpolating comprises interpolating the output signal converted into the Bayer pattern based on an expression $$Da_{0,0} = \sum_{\substack{i=\{-M,\ldots,-2,-1,0,1,2,\ldots,M\} \\ j=\{-N,\ldots,-2,-1,0,1,2,\ldots,N\}}} \alpha_{i,j} X_{i,j},$$

where $Da_{0,0}$ represents a data value of a converted pixel, $X_{i,j}$ represents a data values of the neighboring pixels of the converted pixel, and $\alpha_{i,j}$ is a variable parameter.

According to example embodiments of the present invention, there is provided an image sensor including a photoelectric converter which generates an image signal corresponding to a subject based on incident light and includes a Bayer converter converting the image signal into a Bayer pattern using the above-described method and an image signal processor which interpolates a Bayer pattern signal output from the photoelectric converter using the above-described method and generates an image of the subject.

The photoelectric converter may further include a pixel array which passes light in a predetermined or reference spectrum.

The photoelectric converter may further include a timing generator which generates a row control signal and a column control signal.

The photoelectric converter may further include a row decoder which decodes the row control signal and a row driver which selects one row line from among a plurality of row lines included in the pixel array in response to a decoded row control signal.

The photoelectric converter may further include a correlated double sampling (CDS) block which performs CDS on a signal output from the pixel array and outputs a signal resulting from the CDS to the Bayer converter.

The photoelectric converter may further include a control register block which generates at least one command for controlling a ramp generator which outputs a ramp signal to the timing generator and the CDS block.

The photoelectric converter may further include a column decoder which decodes the column control signal and a column driver which selects one column line from among a plurality of column lines included in the pixel array in response to a decoded column control signal.

The photoelectric converter may further include an output buffer which buffers and outputs a signal output from the Bayer converter in response to a column control signal output from the column driver.

The timing generator may generate at least one control signal for controlling an operation of at least one among the pixel array, the row decoder, the output buffer, the column decoder, and the ramp generator based on the at least one command output from the control register block.

BRIEF DESCRIPTION OF THE DRAWINGS

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

FIG. 3C is a diagram provided to explain a method of converting a pixel array that does not have an output signal in the Bayer pattern into a pixel array that has an output signal in the Bayer pattern and then performing interpolation.

DETAILED DESCRIPTION OF THE EMBODIMENTS

Figure 1:
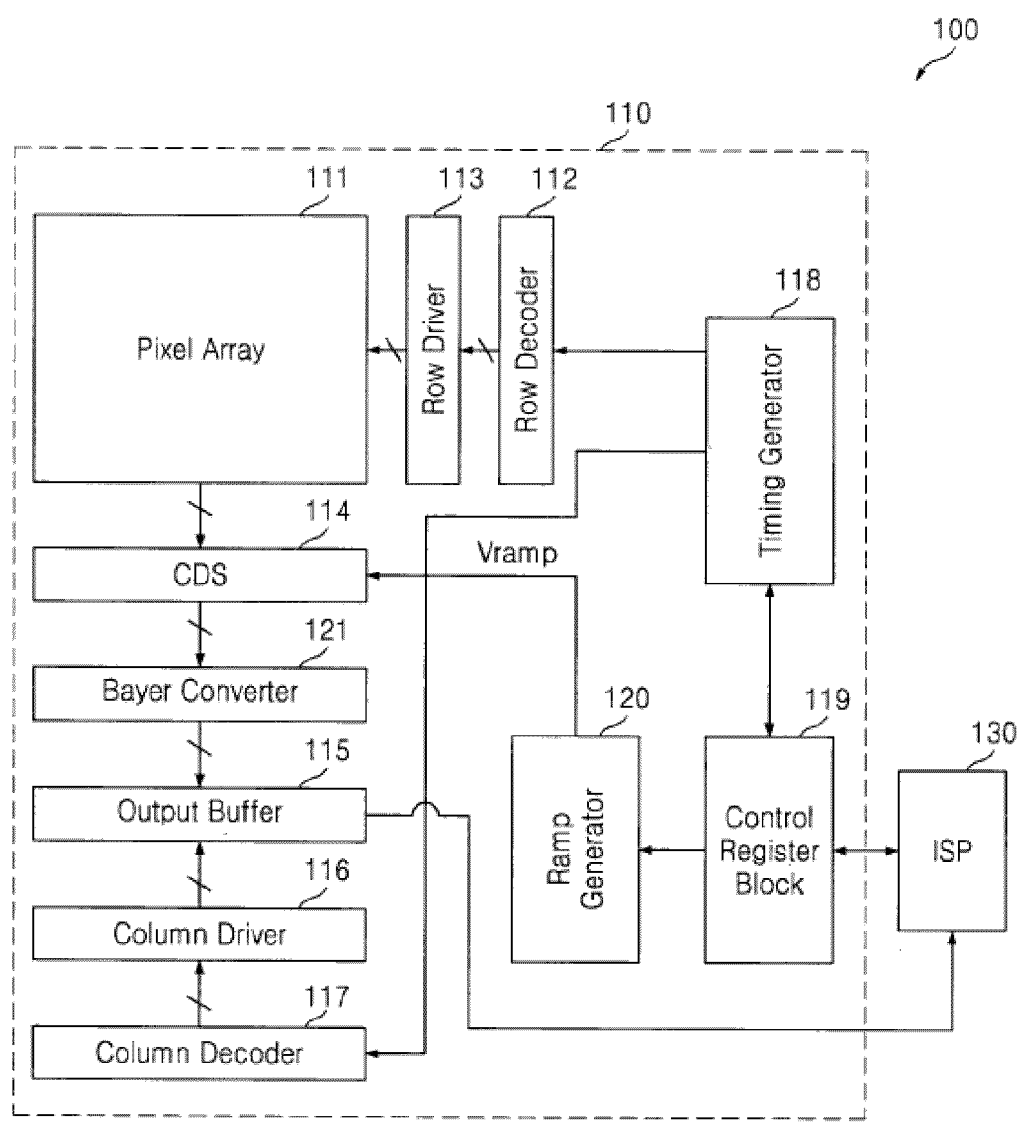
FIG. 1 is a block diagram of an image sensor according to example embodiments of the present invention.

Example embodiments of the present invention now will be described more fully hereinafter with reference to the accompanying drawings, in which embodiments of the invention are shown. This Example embodiments of the present invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram of an image sensor 100 according to example embodiments of the present invention. The image sensor 100 includes a photoelectric converter 110 and an image signal processor (ISP) 130. The photoelectric converter 110 and the ISP 130 may be implemented, for example, in separate chips or modules.

The photoelectric converter 110 generates an image signal corresponding to a subject based on incident light. The photoelectric converter 110 includes a pixel array 111, a row decoder 112, a row driver 113, a correlated double sampling (CDS) block 114, a Bayer converter 121, an output buffer 115, a column driver 116, a column decoder 117, a timing generator 118, a control register block 119, and a ramp generator 120.

The pixel array 111 may include a plurality of pixels connected to a plurality of row lines (not shown) and a plurality of column lines (not shown) in a two-dimensional matrix form. The plurality of pixels may include a red pixel converting red spectrum light into an electrical signal, a green pixel converting green spectrum light into an electrical signal, and a blue pixel converting blue spectrum light into an electrical signal. Above the pixel array 111 is arranged a color filter array to pass light in a predetermined or reference spectrum to each of the pixels.

The row decoder 112 decodes a row control signal (e.g., an address signal) generated by the timing generator 118. The row driver 113 selects at least one line from among the row lines of the pixel array 111 in response to the decoded row control signal.

The CDS block 114 performs CDS on a pixel signal output from a pixel connected to one of the column lines of the pixel array 111. The CDS block 114 may include an analog-to-digital converter (not shown) converting a signal resulting from the CDS into a digital signal.

The Bayer converter 121 converts a pixel signal output from the CDS block 114 into a Bayer pattern. For instance, the Bayer converter 121 may select a single target pixel signal output from a basic pixel block (e.g., a 2×2 matrix) and perform an operation on the target pixel signal and its neighboring pixel signals, thereby outputting an output signal of the basic pixel block in the Bayer pattern.

The output buffer 115 buffers and outputs a Bayer pattern signal received from the Bayer converter 121 in response to a column control signal (e.g., an address signal) output from the column driver 116. The column driver 116 selectively activates at least one of the column lines of the pixel array 111 in response to a column control signal received from the column decoder 117. The column decoder 117 decodes a column control signal generated by the timing generator 118.

The timing generator 118 generates at least one control signal for controlling the operation of at least one among the pixel array 111, the row decoder 112, the output buffer 115, the column decoder 117, and the ramp generator 120 based on a command output from the control register block 119. The control register block 119 generates various commands for controlling the elements of the photoelectric converter 110. The ramp generator 120 outputs a ramp signal Vramp to the CDS block 114 in response to a command generated by the control register block 119.

The ISP 130 interpolates pixel signals output from the photoelectric converter 110 and generates an image of a subject.

The photoelectric converter 110 may not include the Bayer converter 121. At this time, a pixel signal output from the CDS block 114 may be buffered and output by the output buffer 115 to the ISP 130. The ISP 130 may convert pixel signals output from the output buffer 115 into the Bayer pattern and perform image interpolation based on Bayer pattern signals.

Figure 2:
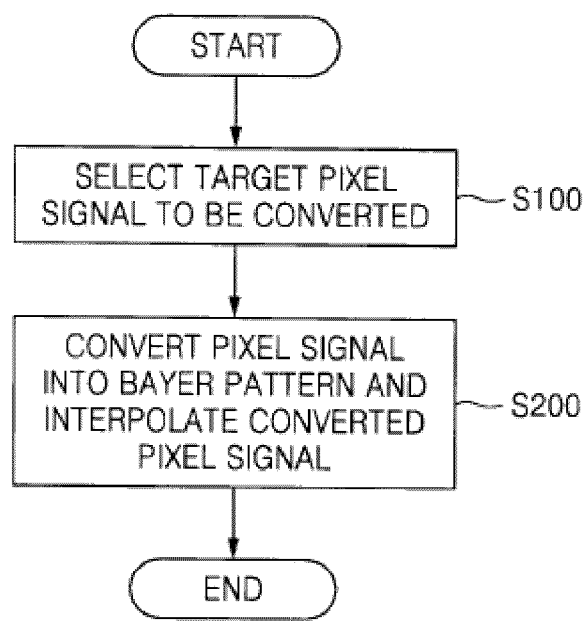
FIG. 2 is a flowchart of an image interpolation method according to example embodiments of the present invention.

FIG. 2 is a flowchart of an image interpolation method according to example embodiments of the present invention. The image interpolation method may be performed by the Bayer converter 121 and/or the ISP 130 illustrated in FIG. 1.

Referring to FIG. 2, to convert pixel signals output from a plurality of pixels, which are divided into M×N basic pixel blocks (where M and N are integers that may be the same as or different from each other) in a pixel array, into a Bayer pattern, a target pixel signal to be converted is selected from among pixel signals output from a plurality of pixels in each of the basic pixel blocks in operation S100. An operation is performed on the target pixel signal and its neighboring pixel signals to convert the basic pixel block and the pixel array into the Bayer pattern, and the pixel signals converted into the Bayer pattern are interpolated in operation S200. At this time, the converting the basic pixel block and the pixel array and the interpolating the pixel signals converted into the Bayer pattern may be performed simultaneously or separately. A method of converting pixel signals into the Bayer pattern and interpolating the pixel signals will be described in greater detail with reference to FIGS. 3A through 3C below.

Figure 3A:
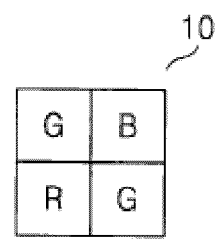
FIG. 3A is a diagram of an example of a basic pixel block in a pixel array which has an output signal in a Bayer pattern.

FIG. 3A is a diagram of an example of a basic pixel block 10 in a pixel array which has an output signal in a Bayer pattern. Although not shown, the pixel array may include a plurality of M×N (e.g., 2×2) basic pixel blocks repeatedly arranged in all directions.

Referring to FIG. 3A, the basic pixel block 10 includes a first layer and a second layer. The first layer includes a first type pixel G and a second type pixel B which are sequentially arranged in a horizontal direction. The second layer includes a third type pixel R and a first type pixel G which are sequentially arranged in the horizontal direction. However, example embodiments of the present invention are not restricted to the current embodiments. For instance, the first layer may sequentially include a second type pixel B or a third type pixel R and a first type pixel G in the horizontal direction and the second layer may sequentially include a first type pixel G and a second type pixel B or a third type pixel R in the horizontal direction. Hereinafter, the example illustrated in FIG. 3A will be explained.

The first type pixel G is green and passes green spectrum light. The second type pixel B is blue and passes blue spectrum light. The third type pixel R is red and passes red spectrum light.

Figure 3B:
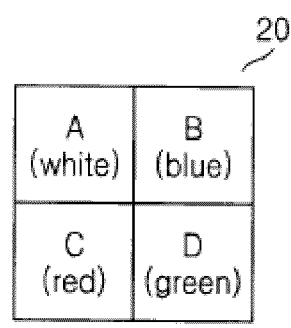
FIG. 3B is a diagram of an example of a basic pixel block in a pixel array which does not have an output signal in the Bayer pattern.

FIG. 3B is a diagram of an example of a basic pixel block 20 in a pixel array which does not have an output signal in the Bayer pattern. The basic pixel block 20 includes a first layer and second layer. The first layer includes a first type pixel A and a second type pixel B which are sequentially arranged in a horizontal direction. The second layer includes a third type pixel C and a fourth type pixel D which are sequentially arranged in the horizontal direction.

The first type pixel A is white, the second type pixel B is blue, the third type pixel C is red, and the fourth type pixel D is green. The white pixel does not filter light and passes all the light and may be implemented by a transparent material layer such as an oxide layer, but example embodiments of the present invention are not restricted thereto.

FIG. 3C is a diagram provided to explain a method of converting a pixel array that does not have an output signal in the Bayer pattern into a pixel array 30 that has an output signal in the Bayer pattern and then performing interpolation. To convert the basic pixel block 20 illustrated in FIG. 3B into the format of the basic pixel block 10 illustrated in FIG. 3A, a signal of the first type pixel A may be converted using a signal of the fourth type pixel D. The pixel array 30 may correspond to an extension of the basic pixel block 20 of FIG. 3B in all directions. A 5×5 matrix is illustrated in FIG. 3C.

Referring to FIG. 3C, an output signal of the pixel array 30 is converted into the Bayer pattern by sampling data from output signals of pixels D for an output signal of the pixel 31.

When pixel signals are converted into the Bayer pattern, a signal of the pixel A 31 is converted into a pixel signal Da. At this time, "Da" indicates a converted pixel signal obtained by receiving signal data from a pixel D at a position of a pixel A. In other words, "Da" is obtained by converting a signal of the first type pixel A using a signal of a fourth type pixel D. If a signal is represented with "Ad", it means that the signal is a result of conversion obtained by receiving signal data from a pixel A at a position of a pixel D.

In detail, a method of converting a signal output from a pixel array including a basic pixel block into the Bayer pattern and then performing interpolation may use Equation (1) or (2). Especially, when the conversion is performed using Equation (2), an image output after the interpolation has an improved quality (e.g., an improved edge quality). Furthermore, when two parameters $\alpha_{i,j}$ and $\beta_0$ in Equation (2) are repeatedly adjusted and tuned, the quality of an image is improved more.

$$Da_{0,0} = \sum_{\substack{i=\{-M,\ldots,-2,-1,0,1,2,\ldots,M\} \\ j=\{-N,\ldots,-2,-1,0,1,2,\ldots,N\}}} \alpha_{i,j} X_{i,j}. \tag{1}$$

$$Da_{0,0} = \sum_{\substack{i=\{-M,\ldots,-2,-1,0,1,2,\ldots,M\} \\ j=\{-N,\ldots,-2,-1,0,1,2,\ldots,N\}}} \alpha_{i,j} X_{i,j} + \beta_0 \cdot Dcorr. \tag{2}$$

Here, $Da_{0,0}$ is an output signal value of a target pixel 31, $X_{i,j}$ represents output signal values corresponding to of one of its neighboring pixels (e.g., A through D). The summations described above with reference to equations (1) and (2) are carried out over values for i and j corresponding to all neighboring pixels X (A, B, C and D) for values i=−M to M and j=−N to N. Values $\alpha_{i,j}$ and $\beta_0$ are variable parameters, and Dcorr is expressed by $$Dcorr = \sum_{\substack{i=\{-M,\ldots,-2,-1,0,1,2,\ldots,M\} \\ j=\{-N,\ldots,-2,-1,0,1,2,\ldots,N\}}} w_n D_{i,j},$$

for values (I,j) corresponding to neighboring pixels of type D, e.g., $Dcorr=w_1 D_{-1,1}+w_2 D_{1,1}+w_3 D_{1,-1}+w_4 D_{-1,-1}$. At this time, $w_n$ (e.g., any one among $w_1$ through $w_4$) is a weight estimated using the variation of the target pixel 31 and has a value according to $D_{i,j}$. The weights $w_1$ through $w_4$ may be estimated using the variation as illustrated in Table 1. $D_{-1,1}$, $D_{1,1}$, $D_{1,-1}$, and $D_{-1,-1}$ are output signal values of neighboring pixels D of the target pixel 31. Here, an output signal of the target pixel 31 is converted using the output signal values of the pixels D, so that a pattern of a signal output from a basic pixel block is converted into the Bayer pattern. The $\alpha_{i,j}$ are constants which are determined by bayer converter 121 based on spectral responses of each pixel and noise levels in a captured image.

Optimum $Da_{0,0}$ is calculated using $\beta_0$ which is changeable by bayer converter 121.

For instance, assuming $Da_{0,0}$ is value_1 when $\beta_0=3$ and $Da_{0,0}$ is value_2 when $\beta_0=0$, a value of $\beta_0$ is 3 when a quality of an output image is improved in $Da_{0,0}$=value_1. That is, a value of $\beta_0$ is set through changing by bayer converter 121 to find optimum quality of an output image.

The parameter $\alpha_{i,j}$ may satisfy $\alpha_{i,j}=\alpha_{-i,-j}=\alpha_{i,-j}=\alpha_{-i,j}$.

According to Equation (2), the output signal of the target pixel 31 is converted using the output signals of its neighboring pixels D, but example embodiments of the present invention are not restricted to the current embodiments. For instance, an output signal of a target pixel B may be converted using output signals of its neighboring pixels C or an output signal of a target pixel may be converted using output signals of different types of neighboring pixels.

TABLE 1

| D | Equation for variation estimation |
|---|---|
| $D_{-1,1}$ | $Var_1 = \min\left\{\|A_{0,0} - A_{-2,2}\|, \left\|A_{0,0} - \frac{A_{-2,0} + A_{0,2}}{2}\right\|\right\}$ |
| $D_{1,1}$ | $Var_2 = \min\left\{\|A_{0,0} - A_{2,2}\|, \left\|A_{0,0} - \frac{A_{2,0} + A_{0,2}}{2}\right\|\right\}$ |
| $D_{1,-1}$ | $Var_3 = \min\left\{\|A_{0,0} - A_{2,-2}\|, \left\|A_{0,0} - \frac{A_{2,0} + A_{0,-2}}{2}\right\|\right\}$ |
| $D_{-1,-1}$ | $Var_4 = \min\left\{\|A_{0,0} - A_{-2,-2}\|, \left\|A_{0,0} - \frac{A_{-2,0} + A_{0,-2}}{2}\right\|\right\}$ |

Here, a function $w_n=f(Var_n)$ is a decreasing function and $w_1+w_2+w_3+w_4=1$. In Table 1, $Var_1$ is a minimum value between $|A_{0,0}-A_{-2,2}|$ and $$\left|A_{0,0} - \frac{A_{-2,0} + A_{0,2}}{2}\right|$$

and $w_n$ may be expressed by Equation (3) or (4). At this time, $A_{-2,0}$, $A_{-2,2}$, $A_{0,0}$, and $A_{0,2}$ are output signal values of corresponding pixels.

$$w_n = \frac{v_n}{v_1 + v_2 + v_3 + v_4}, \tag{3}$$

$$v_n = \exp(-Var_n/Th),$$

where Th is a predetermined or reference threshold value that can be adjusted.

$$k=\text{order}(Var_n)$$

$$w_n=kc_k \tag{4}$$

$$c_k=\text{const}; \Sigma w_n=1,$$

where k is a value n corresponding to a descending rank order of $Var_n$ and $c_k$ is a constant.

For instance, when $Var_1=10$, $Var_2=5$, $Var_3=7$, and $Var_4=6$ in Equation (4), $w_1=1c_k$, $w_2=3c_k$, $w_3=4c_k$, and $w_4=2c_k$ according to the descending order of the $Var_n$. Since $\Sigma w_n=1$, i.e., $w_1+w_2+w_3+w_4=1$, $$c_k = \frac{1}{10} \text{ and } w_1 = \frac{1}{10},$$

-continued $$w_2 = \frac{3}{10},$$

$$w_3 = \frac{4}{10},$$

and $$w_4 = \frac{2}{10}.$$

As described above, $w_n$ may be obtained using Equation (3) or (4).

Figure 4A:
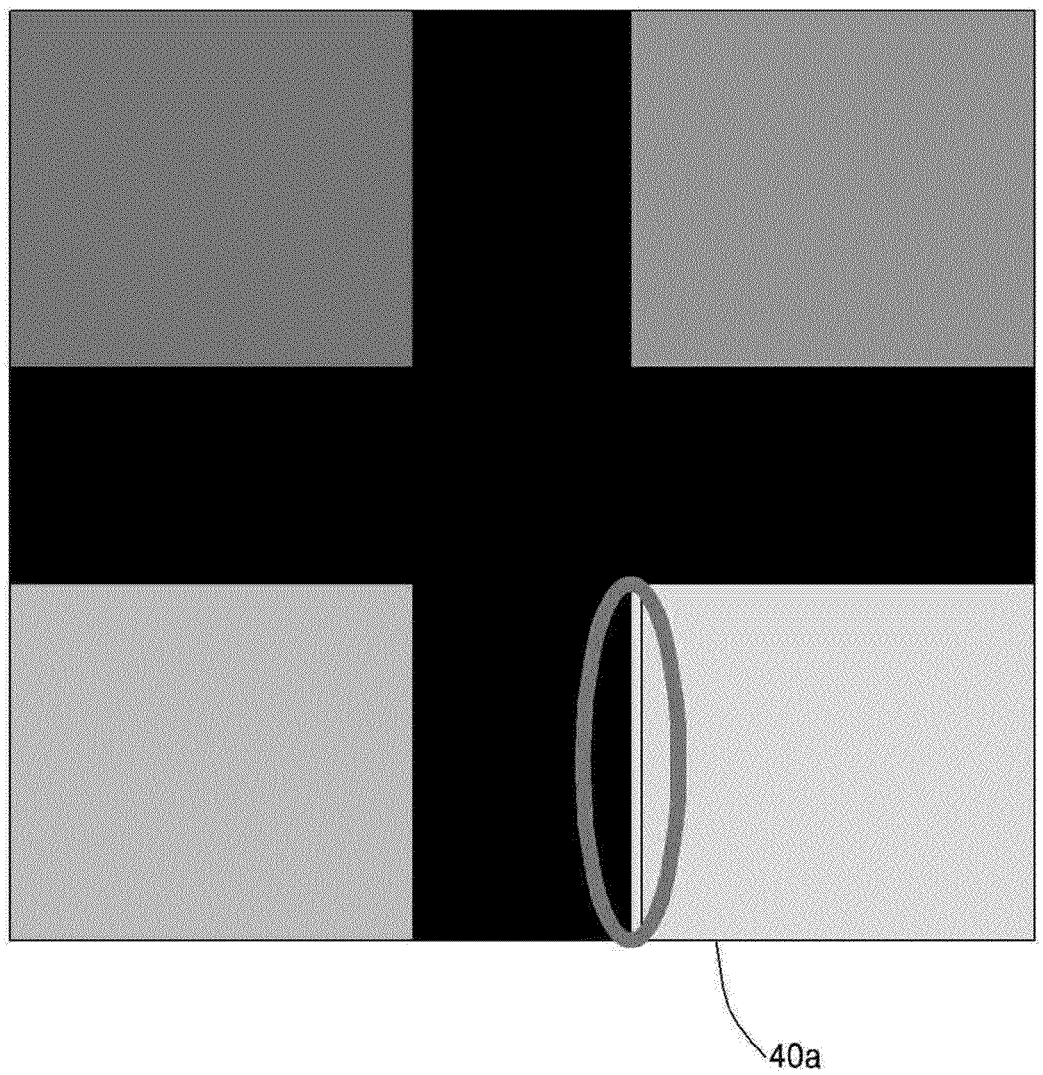
FIGS. 4A and 4B are diagrams of an image before being improved and an image after being improved according to example embodiments of the present invention.
Figure 4B:
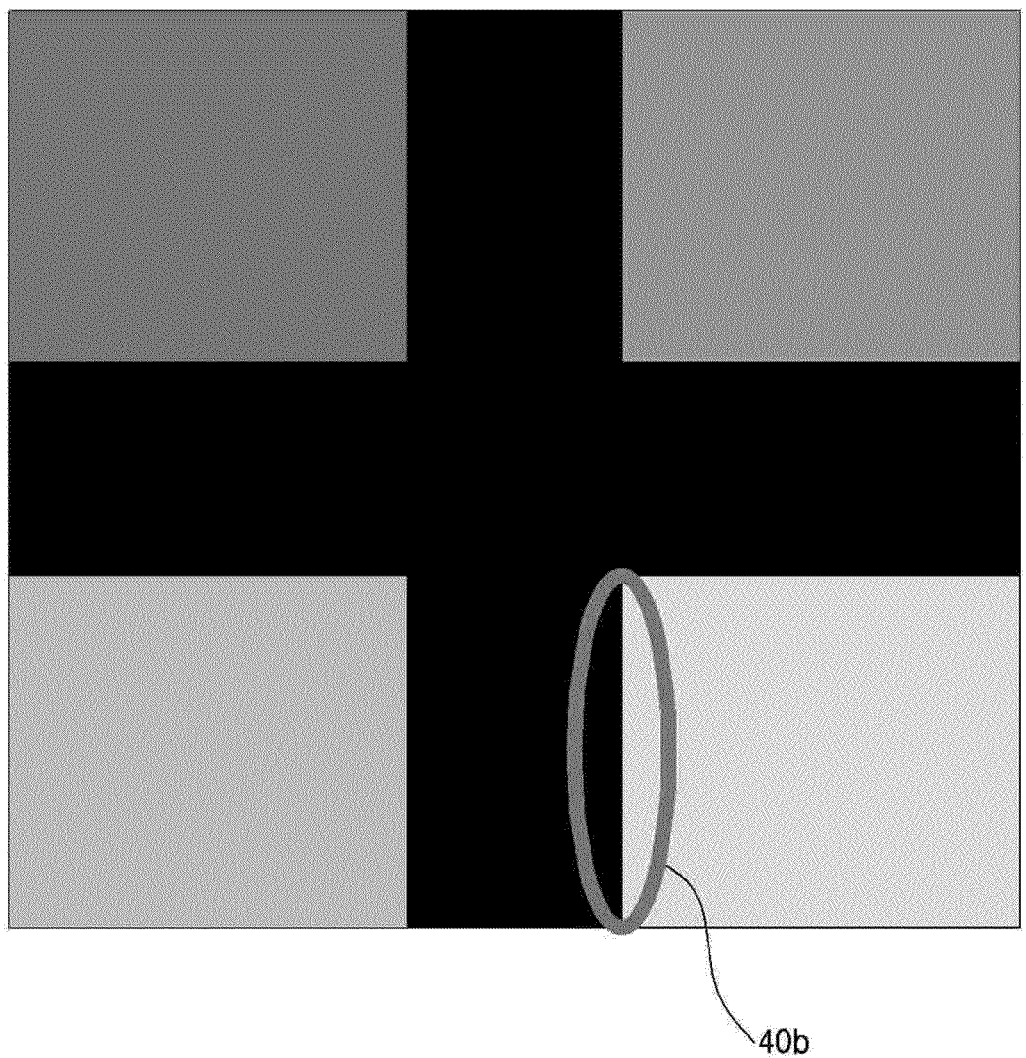

FIGS. 4A and 4B are diagrams of images respectively obtained before and after quality is improved using Equation (2). FIG. 4A shows an edge 40a before the quality of the image is improved and FIG. 4B shows an edge 40b after the quality of the image is improved. Referring to FIGS. 4A and 4B, edge image quality is improved by using Equation (2).

Figure 5:
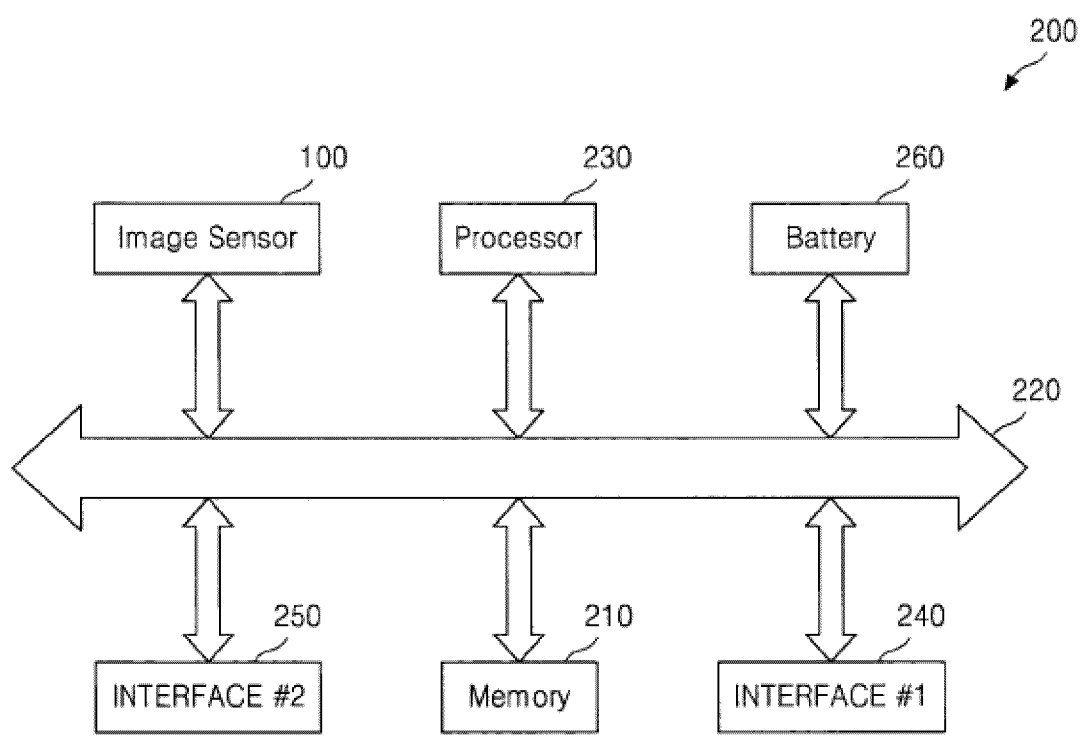
FIG. 5 is a block diagram of an electronic system including the image sensor illustrated in FIG. 1.

FIG. 5 is a block diagram of an electronic system 200 including the image sensor 100 illustrated in FIG. 1. Referring to FIG. 5, the electronic system 200 includes the image sensor 100, a memory device 210, and a processor 230, which are connected to a system bus 220. The image sensor 100 includes a color filter array according to example embodiments of the present invention. The electronic system 200 may be a digital camera, a cellular telephone equipped with a digital camera, or a satellite system equipped with a camera, but example embodiments of the present invention is not restricted thereto.

The processor 230 may generate control signals for controlling the operations of the image sensor 100 and the memory device 110. The image sensor 100 may generate an image of a subject and the memory device 210 may store the image.

When the electronic system 200 is embodied as a portable application, the electronic system 200 may also include a battery 260 to supply operating power to the image sensor 100, the memory device 210, and the processor 230. The portable application may be a portable computer, a digital camera, a personal digital assistant (PDA), a cellular telephone, an MP3 player, a portable multimedia player (PMP), an automotive navigation system, a memory card, or an electronic dictionary. The electronic system 200 may also include interface #1 240 and interface #2 250, e.g., input/output units, to communicate data with an external data processing device.

Example embodiments of the present invention can be embodied in hardware, software, firmware or combination thereof. Example embodiments embodied in software can be embodied as computer readable codes or programs on a computer readable recording medium.

The computer readable recording medium may be any data storage device that can store data which can be thereafter read by a computer system. Examples of the computer readable recording medium include read-only memory (ROM), random-access memory (RAM), CD-ROMs, magnetic tapes, floppy disks, and optical data storage devices. The program codes for executing a method of upgrading an operation program in an RFID system may be transmitted in the form of carrier waves (such as data transmission through the Internet).

The computer readable recording medium can also be distributed over network coupled computer systems so that the computer readable code is stored and executed in a distributed fashion. Also, functional programs, codes, and code segments for accomplishing example embodiments of the present invention can be easily construed by programmers skilled in the art to which example embodiments of the present invention pertain.

As described above, according to example embodiments of the present invention, a signal of a color filter array is converted into a Bayer pattern and then interpolated, so that even if input data includes noise, high-quality clear output image is provided.

Example embodiments of the present invention having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A method of interpolating a signal output from an image sensor including a pixel array having an M×N matrix as a basic pixel block where M and N are integers, the method comprising:

selecting a target pixel signal from among pixel signals output from the basic pixel block;

converting a pattern of a pixel signal output from the pixel array into a Bayer pattern by converting a pixel signal output from the basic pixel block into the Bayer pattern through an operation using the target pixel signal and neighboring pixel signals of the target pixel signal; and interpolating an output signal converted into the Bayer pattern, the interpolating including performing a summation operation based on a plurality of signals from among the neighboring pixel signals, wherein the interpolating an output signal includes using $$Da_{0,0} = \sum_{\substack{i=\{-M,\ldots,-2,-1,0,1,2,\ldots,M\} \\ j=\{-N,\ldots,-2,-1,0,1,2,\ldots,N\}}} \alpha_{i,j} X_{i,j} + \beta_0 \cdot Dcorr,$$

where $Da_{0,0}$ represents a signal value of the converted output pixel signal, represents output signal of the neighboring pixels of the converted pixel, $\alpha_{i,j}$ and $\beta_0$ are variable parameters, and $$Dcorr = \sum_{\substack{i=\{-M,\ldots,-2,-1,0,1,2,\ldots,M\} \\ j=\{-N,\ldots,-2,-1,0,1,2,\ldots,N\}}} w_n D_{i,j}$$

where $w_n$ is a weight determined based on a variation of the target pixel signal, and $D_{i,j}$ represents output signal values of one type of the neighboring pixels.

2. The method of claim 1, wherein the weight $w_n$ is defined by $$\frac{v_n}{\sum v_n},$$

where $v_n = \exp(-Var_n/Th)$, $Var_n$ is the variation of the target pixel signal, Th is a threshold value, and $\Sigma w_n = 1$.

3. The method of claim 1, wherein the weight $w_n$ is obtained based on an expression using $k=order(Var_n)$, $w_n=kc_k$, $c_k=const$; $\Sigma w_n=1$, where k is a value corresponding to a descending rank order of the variation $Var_n$ and $c_k$ is a constant.

4. The method of claim 1, wherein the parameter $\alpha_{i,j}$ satisfies an expression $\alpha_{i,j}=\alpha_{-i,-j}=\alpha_{i,-j}=\alpha_{-i,j}$.

5. The method of claim 1, wherein the weight $w_n$ is defined as a function of the variation of the target pixel signal, the function of the variation being a decreasing function.

6. The method of claim 1, further comprising:
repeatedly adjusting the two variable parameters $\alpha_{i,j}$ and $\beta_o$.

7. An image sensor comprising:
a pixel array comprising a plurality of pixels;
a Bayer converter configured to convert a signal, which has been output from the pixel array and subjected to correlated double sampling, into a Bayer pattern and output a Bayer pattern signal; and
an image signal processor configured to receive the Bayer pattern signal after the Bayer pattern signal is buffered, interpolate the Bayer pattern signal by performing, for a target pixel from among the plurality of pixels, a summation operation based on a plurality of signals from among signals of pixels neighboring the target pixel, and generate an image of a subject,
wherein the image signal processor is configured such that the interpolating the Bayer pattern signal includes using $$Da_{0,0} = \sum_{\substack{i=\{-M,\ldots,-2,-1,0,1,2,\ldots,M\} \\ j=\{-N,\ldots,-2,-1,0,1,2,\ldots,N\}}} \alpha_{i,j} X_{i,j} + \beta_0 \cdot Dcorr,$$

where $Da_{0,0}$ represents a signal value of the converted output pixel signal, $X_{i,j}$ represents output signal values of the neighboring of the converted pixel, $\alpha_{i,j}$ and $\beta_0$ are variable parameters, and $$Dcorr = \sum_{\substack{i=\{-M,\ldots,-2,-1,0,1,2,\ldots,M\} \\ j=\{-N,\ldots,-2,-1,0,1,2,\ldots,N\}}} w_n D_{i,j}$$

where $w_n$ is a weight determined based on a variation of the target pixel signal, and $D_{i,j}$ represents output signal values of one type of the neighboring pixels.

8. An image sensor comprising:
a photoelectric converter configured to generate an image signal corresponding to a subject based on incident light; and
an image signal processor configured to convert the image signal output from the photoelectric converter into a Bayer pattern signal, interpolate an output signal based on the Bayer pattern signal by performing, for a target pixel from among a plurality of pixels, a summation operation based on a plurality of signals from among signals of pixels neighboring the target pixel, and generate an image of the subject,
wherein the image signal processor is configured to interpolate the output signal by using $$Da_{0,0} = \sum_{\substack{i=\{-M,\ldots,-2,-1,0,1,2,\ldots,M\} \\ j=\{-N,\ldots,-2,-1,0,1,2,\ldots,N\}}} \alpha_{i,j} X_{i,j} + \beta_0 \cdot Dcorr,$$

where $Da_{0,0}$ represents an output signal value of a converted pixel, $X_{i,j}$ represents output signal values of the neighboring pixels of the converted pixel, $\alpha_{i,j}$ and $\beta_0$ are variable parameters and $$Dcorr = \sum_{\substack{i=\{-M,\ldots,-2,-1,0,1,2,\ldots,M\} \\ j=\{-N,\ldots,-2,-1,0,1,2,\ldots,N\}}} w_n D_{i,j}$$

where $w_n$ is a weight estimated using a variation of the target pixel signal and $D_{i,j}$ represents output signal values of one type of the neighboring pixels.

9. The image sensor of claim 8, wherein the weight $w_n$ is defined by $$\frac{v_n}{\sum v_n},$$

where $v_n = \exp(-Var_n/Th)$, $Var_n$ is the variation of the target pixel signal, Th is a threshold value, and $\Sigma w_n = 1$.

10. The image sensor of claim 9, wherein the weight $w_n$ is obtained based on an expression $k=\text{order}(Var_n)$, $w_n=kc_k$, $c_k=\text{const}$; $\Sigma w_n=1$, where k is a value corresponding to a descending rank order of the variation $Var_n$ and $c_k$ is a constant.

11. The image sensor of claim 7, wherein the parameter $\alpha_{i,j}$ satisfies an expression $\alpha_{i,j}=\alpha_{-i,-j}=\alpha_{i,-j}=\alpha_{-i,j}$.

12. The image sensor of claim 7, wherein the weight $w_n$ is defined as a function of the variation, the function of the variation being a decreasing function.

13. The image sensor of claim 7, the image signal processor configured to repeatedly adjust the two variable parameters $\alpha_{i,j}$ and $\beta_0$.

14. An electronic system comprising the image sensor of claim 7.

* * * * *